United States Patent
Wang-Lee

[11] Patent Number: 6,068,376
[45] Date of Patent: May 30, 2000

[54] EYEGLASSES HAVING A UNITARY LENS PIECE

[76] Inventor: Min-Young Wang-Lee, No. 473, Jong-Shan S. Rd, Yung-Shan City, Tainan Hsien, Taiwan

[21] Appl. No.: 09/426,613

[22] Filed: Oct. 26, 1999

[51] Int. Cl.⁷ .................. G02C 5/14; G02C 5/22
[52] U.S. Cl. .................. 351/120; 351/153; 16/228
[58] Field of Search .................. 351/120, 111, 351/153, 140, 41; 16/228

[56] References Cited

U.S. PATENT DOCUMENTS

| | | | |
|---|---|---|---|
| 4,991,952 | 2/1991 | Grou | 351/120 |
| 5,457,503 | 10/1995 | Chen | 351/120 |
| 5,457,505 | 10/1995 | Canavan et al. | 351/120 |

*Primary Examiner*—Hung Xuan Dang
*Attorney, Agent, or Firm*—Merchant & Gould P.C.

[57] ABSTRACT

An eyeglasses assembly includes a pair of glasses formed as a one-piece molded body, a pair of pivot parts, and a pair of temples. The glasses have inner end portions connected to each other, opposite outer end portions which are curved rearwardly, and a top edge extending between the outer end portions. The pivot parts are disposed on the outer end portions. Each of the pivot parts has parallel upper and lower plate members projecting transversely from the outer end portions. Each of the plate members has a front end located below the top edge, and a rear end located at a level below the front end. Each of the pivot parts further has a pivot pin passing through perpendicularly and mounted on the upper and lower plate members. The temples are mounted pivotally on the pivot pins of the pivot parts, respectively, and have free ends provided with earpieces, respectively, wherein the temples including the earpieces lie in a plane which forms an angle with a first horizontal plane intersecting the pivot pins when the eyeglasses assembly rests on a second horizontal plane.

6 Claims, 3 Drawing Sheets

EYEGLASSES HAVING A UNITARY LENS PIECE

BACKGROUND OF THE INVENTION

1. Field of the Invention

The invention relates to an eyeglasses assembly, more particularly to an eyeglasses assembly that has a particular design with respect to an angle between a lens piece and temples.

2. Description of the Related Art

It is known to provide an eyeglasses assembly with a unitary lens piece, and a pair of temples connected pivotally to the lens piece. In the eyeglasses assembly of this type, the temples are usually disposed in a horizontal direction. However, as wearers have different positional relationships among parts of their heads or faces, such a conventional eyeglasses assembly can make a wearer uncomfortable if it does not suit his/her head or face. Adjustable temples have been available for adjustment of the angle thereof relative to the lens piece. However, these temples complicate the construction and increase the cost of eyeglasses.

SUMMARY OF THE INVENTION

Therefore, the object of the present invention is to provide an inexpensive eyeglasses assembly with an improved design with respect to an angle between the lens piece and the temples so as to accommodate different wearers and make them feel comfortable.

According to the present invention, an eyeglasses assembly includes a pair of glasses formed as a one-piece molded body, a pair of pivot parts and a pair of temples. The glasses have inner end portions connected to each other, opposite outer end portions which are curved rearwardly, and a top edge extending between the outer end portions. The pivot parts are disposed on the outer end portions. Each of the pivot parts has parallel upper and lower plate members projecting transversely from a corresponding one of the outer end portions. Each of the plate members has a front end located below a corresponding one of the top edge, and a rear end located at a level below the front end. Each of the pivot parts further has a pivot pin passing through perpendicularly and mounted on the upper and lower plate members. The temples are mounted pivotally on the pivot pins of the pivot parts, respectively, and have free ends respectively provided with earpieces, wherein the temples including the earpieces lie in a plane which forms an angle with a first horizontal plane intersecting the pivot pins when the eyeglasses assembly rests on a second horizontal plane.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
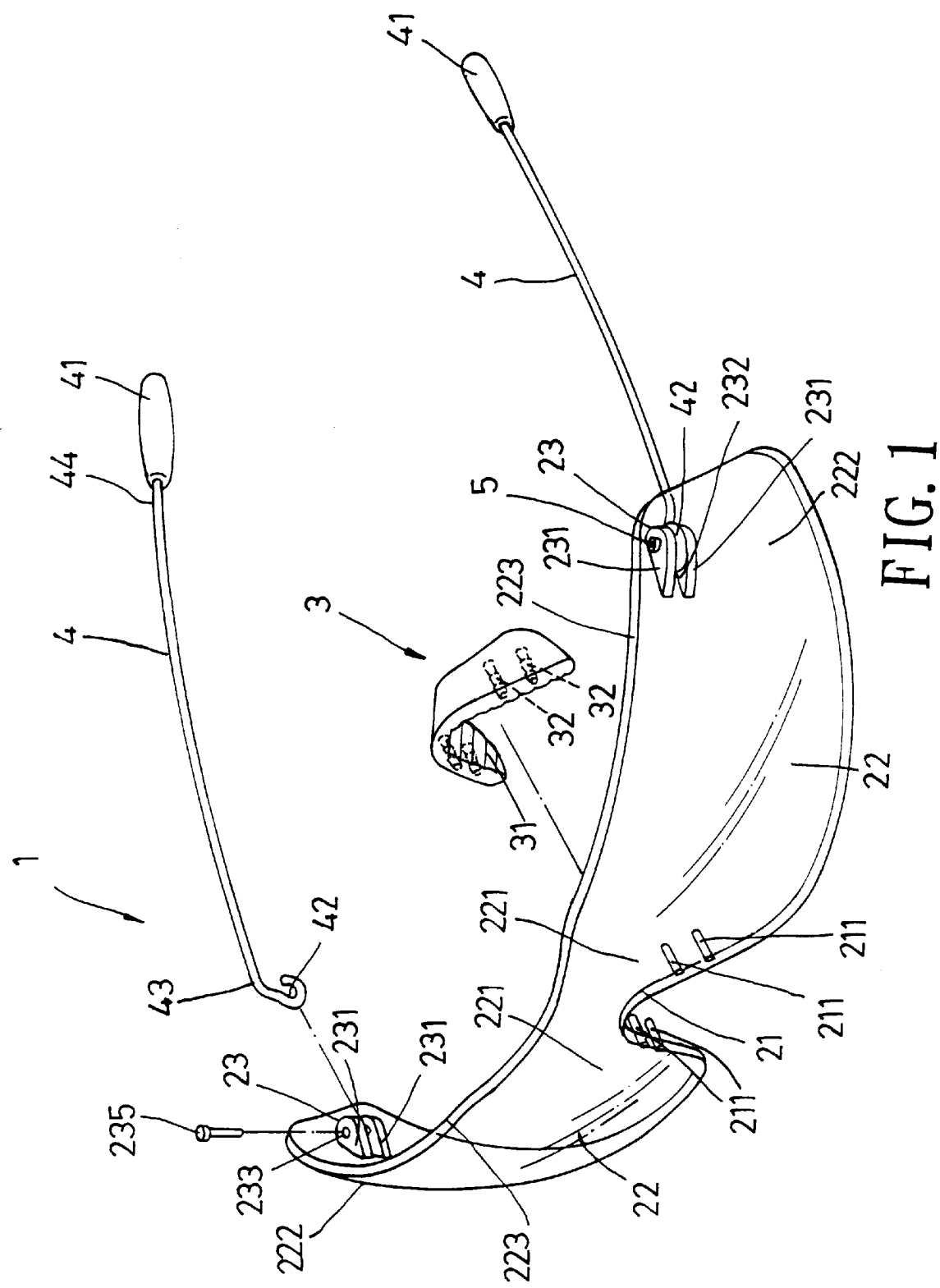
FIG. 1 is an exploded perspective view of the preferred embodiment of an eyeglasses assembly according to the present invention.
Figure 2:
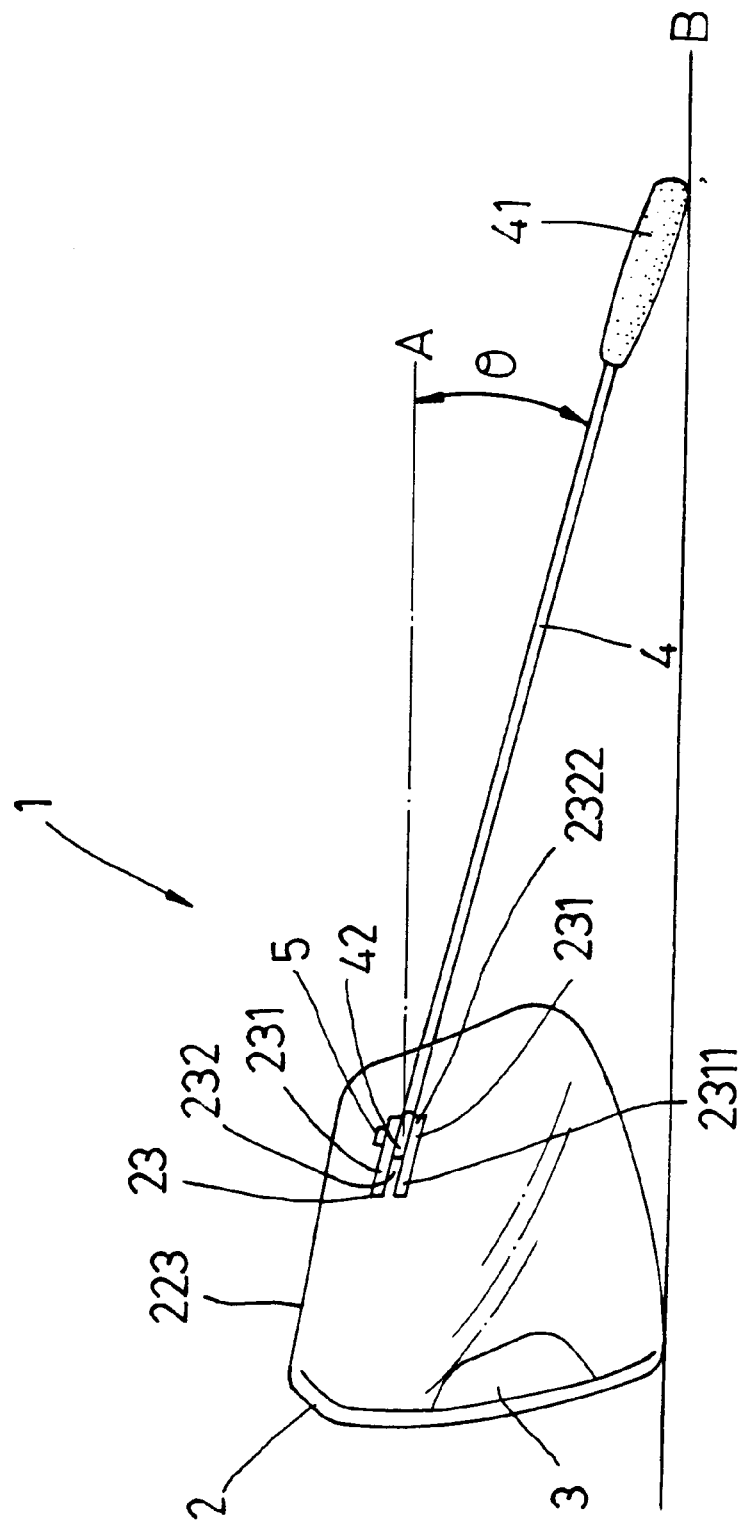
FIG. 2 is a side view of the preferred embodiment.
Figure 3:
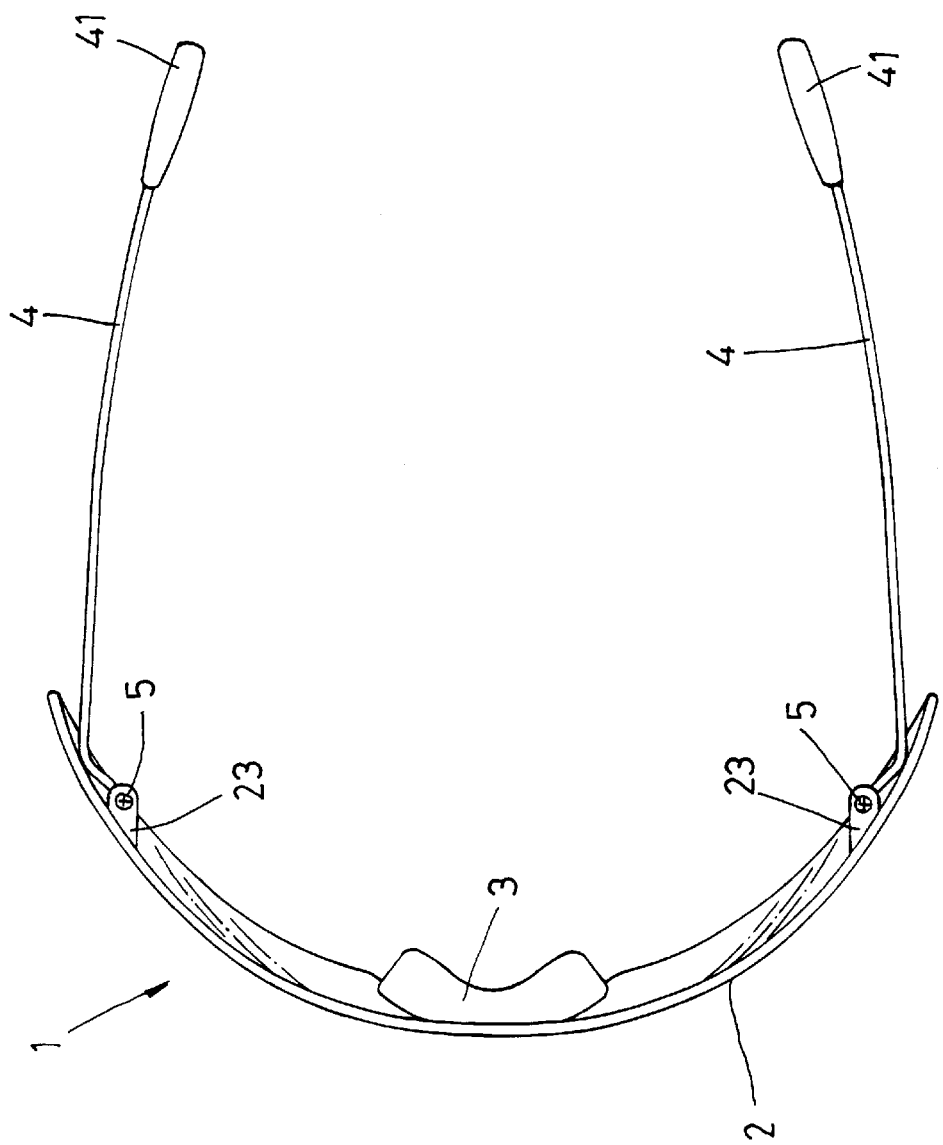
FIG. 3 is a top view of the preferred embodiment.

Referring to FIGS. 1 to 3, according to the preferred embodiment of the present invention, an eyeglasses assembly 1 is shown to include a pair of glasses 22 formed as a one-piece molded body, a nose pad 3, a pair of pivot parts 23, and a pair of temples 4.

The glasses 22 have inner end portions 221 connected to each other, opposite outer end portions 222 which are curved rearwardly, and a top edge 223 extending from one to the other of the outer end portions 222. The inner end portions 221 have rearwardly projecting insert pins 211.

The nose pad 3 is connected to the inner end portions 221 of the glasses 22. The nose pad 3 is made of rubber or plastic, and is formed as a substantially inverted U-shape. The nose pad 3 has a concave inner surface 31 facing downwardly, and integral socket elements 32 which receive fittingly the insert pins 211, respectively.

The pivot parts 23 are disposed on the outer end portions 222, respectively. Each of the pivot parts 23 has parallel upper and lower plate members 231 projecting transversely from a corresponding one of the outer end portions 222. Each of the upper and lower plate members 231 has a front end 2311 (FIG. 2) located below the top edge 223, and a rear end 2322 located at a level below the front end 2311. Each of the pivot parts 23 further has a pivot pin 235 that passes threadedly and perpendicularly through threaded holes 233 formed in the upper and lower plate members 231 of a corresponding one of the pivot parts 23.

Each of the temples 4 has a free end 44, and an end part 43 opposite to the free end 44. The free ends 44 are provided with earpieces 41 for resting on the ears of a wearer, respectively. The end parts 43 are bent inwardly toward each other. Each end part 43 has a hook ends 42 that extends around a corresponding one of the pivot pins 235 between the upper and lower plate members 231, thereby connecting pivotally with the pivot pins 235, respectively. The temples 4 including the earpieces 41 lie in a plane which forms an angle ($\theta$) with a first horizontal plane (A) intersecting the pivot pins 235 when the eyeglasses assembly 1 rests on a second horizontal plane (B). The angle ($\theta$) is preferably in the range of 8°~16°. In this embodiment, the angle ($\theta$) is 14°.

Due to the angle ($\theta$) between the temples 4 and the first horizontal plane (A), the eyeglasses assembly 1 can be worn comfortably by wearers having different facial forms. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An eyeglasses assembly, comprising:

a pair of glasses formed as a one-piece molded body, said glasses having inner end portions connected to one another, opposite outer end portions which are curved rearwardly, and top edges extending between said inner and outer end portions;

a pair of pivot parts disposed on said outer end portions, repectively, each of said pivot parts having parallel upper and lower plate members projecting transversely from a corresponding one of said outer end portions, each of said upper and lower plate members having a front end located below a corresponding one of said top edges, and a rear end located at a level below said front end, each of said pivot parts further having a pivot pin passing through perpendicularly and mounted on said upper and lower plate members; and a pair of temples mounted pivotally on said pivot pins of said pivot parts, respectively, and having free ends provided with earpieces, respectively, wherein said temples including said earpieces lie in a plane which forms an angle with a first horizontal plane intersecting said pivot pins when said eyeglasses assembly rests on a second horizontal plane.

2. The eyeglasses assembly as claimed in claim 1, wherein said angle is in the range of 8°~16°.

3. The eyeglasses assembly as claimed in claim 2, wherein said angle is 14°.

4. The eyeglasses assembly as claimed in claim 1, further comprising a nose pad connected to said inner end portions.

5. The eyeglasses assembly as claimed in claim 4, wherein said inner end portions have rearwardly projecting insert pins, said nose pad being formed as a substantially inverted U-shape and having a concave inner surface facing downwardly, said inner surface having integral socket elements which receive fittingly said insert pins, respectively.

6. The eyeglasses assembly as claimed in claim 1, wherein said temples include end parts which are opposite to said free ends, which are bent inwardly along directions toward each other, and which have hook ends connected to said pivot pins, respectively.

* * * * *